United States Patent
Okita (10) Patent No.: US 9,648,213 B2
(45) Date of Patent: May 9, 2017

(54) IMAGE SENSOR, IMAGE CAPTURING APPARATUS, AND CONTROL METHOD OF IMAGE CAPTURING APPARATUS

(71) Applicant: CANON KABUSHIKI KAISHA, Tokyo (JP)

(72) Inventor: Masaki Okita, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/755,797

(22) Filed: Jun. 30, 2015

(65) Prior Publication Data

US 2016/0006905 A1 Jan. 7, 2016

(30) Foreign Application Priority Data

Jul. 1, 2014 (JP) ................................. 2014-136216

(51) Int. Cl.
*H04N 5/217* (2011.01)
*H04N 5/232* (2006.01)
*H04N 5/369* (2011.01)

(52) U.S. Cl.
CPC ....... *H04N 5/2176* (2013.01); *H04N 5/23212* (2013.01); *H04N 5/3696* (2013.01)

(58) Field of Classification Search
CPC . H04N 5/2176; H04N 5/3696; H04N 5/23212
See application file for complete search history.

(56) References Cited

U.S. PATENT DOCUMENTS

| | | | | |
|---|---|---|---|---|
| 5,627,583 A * | 5/1997 | Nakamura | ......... | A61B 1/00059 348/65 |
| 5,896,166 A * | 4/1999 | D'Alfonso | ........... | A61B 1/0002 348/72 |
| 6,295,082 B1 * | 9/2001 | Dowdy | .............. | A61B 1/00059 348/231.99 |
| 8,089,509 B2 * | 1/2012 | Chatenever | ............ | A61B 1/042 348/207.1 |
| 8,199,188 B2 * | 6/2012 | Amling | .................. | H04N 5/232 348/231.3 |
| 2006/0114527 A1 * | 6/2006 | Tsukioka | .................. | H04N 5/57 358/519 |
| 2010/0027885 A1 * | 2/2010 | Aragaki | .................. | G06T 5/002 382/167 |
| 2010/0277625 A1 * | 11/2010 | Utsugi | ................... | H04N 9/045 348/246 |
| 2011/0228127 A1 * | 9/2011 | Nakagawa | ............... | G02B 7/34 348/222.1 |
| 2011/0261236 A1 * | 10/2011 | Tamura | ................ | H04N 5/3572 348/242 |
| 2013/0155265 A1 * | 6/2013 | Bae | ...................... | H04N 5/2173 348/208.11 |

(Continued)

FOREIGN PATENT DOCUMENTS

JP 2012-120158 A 6/2012

*Primary Examiner* — Timothy J Henn
(74) *Attorney, Agent, or Firm* — Cowan, Liebowitz & Latman, P.C.

(57) ABSTRACT

An image sensor comprises: a pixel array having image forming pixels and phase-difference detecting pixels; and an outputting unit configured to add correction processing information, and position information of the phase-difference detecting pixels to image data obtained from the pixel array and to output the image data.

13 Claims, 8 Drawing Sheets

(56) References Cited

U.S. PATENT DOCUMENTS

| | | | | |
|---|---|---|---|---|
| 2013/0155271 A1* | 6/2013 | Ishii | .................. | H04N 5/23212 |
| | | | | 348/222.1 |
| 2013/0221470 A1* | 8/2013 | Kinsman | ........... | H01L 27/14618 |
| | | | | 257/434 |
| 2014/0184755 A1* | 7/2014 | Shibazaki | ......... | H01L 27/14621 |
| | | | | 348/50 |
| 2015/0189109 A1* | 7/2015 | Whitby-Strevens | ...... | G06F 3/14 |
| | | | | 348/207.1 |
| 2015/0288872 A1* | 10/2015 | Mikawa | ............. | H04N 5/23216 |
| | | | | 348/345 |

* cited by examiner

IMAGE SENSOR, IMAGE CAPTURING APPARATUS, AND CONTROL METHOD OF IMAGE CAPTURING APPARATUS

BACKGROUND OF THE INVENTION

Field of the Invention

The present invention relates to an image sensor, an image capturing apparatus, and a method for controlling the image capturing apparatus.

Description of the Related Art

It is known that a phase difference AF (Auto Focus) function can be realized by arranging, on an image capturing sensor, phase-difference detecting pixels that are capable of photoelectrically converting a part of a light flux passing through a microlens and outputting it.

In order to realize the phase difference AF function using the image capturing sensor, pixels that generate phase-difference detecting signals necessary for phase difference AF are required to be identified. Japanese Patent Laid-Open No. 2012-120158 discloses that information identifying phase-difference detecting pixels and image forming pixels is added to the payload in which pixel data equivalent to a single line of the image sensor is stored, and a DSP identifies whether the pixel data serves to detect a phase difference or to form an image by referring to the information.

As disclosed in Japanese Patent Laid-Open No. 2012-120158, the processing efficiency for the phase difference AF function can be increased by adding signals for determining whether the pixel data represents phase-difference detecting pixels or image forming pixels.

However, output signals of phase-difference detecting pixels may possibly be optically affected by the light flux reaching an imaging plane and affected by electrical properties specific to the phase-difference detecting pixels. Therefore, in order to realize the phase difference AF function, it is necessary to correct a plurality of adjustment parameters such as the positional relationship on the image sensor, the offset, and the amount of gain. Generally, such a plurality of adjustment parameters are sequentially corrected by a plurality of circuit blocks corresponding to the respective parameters. Therefore, a control unit of an image capturing apparatus controls processes of the respective blocks individually, and completes the correction processing as a whole. Since responses of the respective circuit blocks to the control unit may possibly be asynchronous depending on contents of the processes, the processing flow and the state transition tend to be complex, and the processing load on the control unit tends to increase.

SUMMARY OF THE INVENTION

The present invention has been made in consideration of the aforementioned problems, and realizes a technique that allows for a reduction in load on a control unit configured to control correction processing due to an image sensor having phase-difference detecting pixels.

In order to solve the aforementioned problems, the present invention provides an image sensor comprising: a pixel array having image forming pixels and phase-difference detecting pixels; and an outputting unit configured to add correction processing information, and position information of the phase-difference detecting pixels to image data obtained from the pixel array and to output the image data.

In order to solve the aforementioned problems, the present invention provides an image capturing apparatus comprising: an image sensor including a pixel array having image forming pixels and phase-difference detecting pixels, and an outputting unit configured to add correction processing information and position information of the phase-difference detecting pixels to image data obtained from the pixel array and to output the image data; and an image processing unit configured to perform predetermined image processing on the image data using the correction processing information and the position information of the phase-difference detecting pixels.

In order to solve the aforementioned problems, the present invention provides a control method of an image capturing apparatus comprising: an outputting step of adding correction processing information and position information of a phase-difference detecting pixels to image data obtained from a pixel array having image forming pixels and the phase-difference detecting pixels and outputting the image data from an image sensor; and an image processing step of performing predetermined image processing on the image data using the correction processing information and the position information of the phase-difference detecting pixels.

According to the present invention, the load on the control unit configured to control the correction processing due to the image sensor having the phase-difference detecting pixels can be reduced.

Further features of the present invention will become apparent from the following description of exemplary embodiments (with reference to the attached drawings).

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

First Embodiment

Hereinafter, a description is given of an example in which the present invention is applied to a digital camera serving as an example of an image capturing apparatus and including an image sensor capable of generating phase difference AF signals. However, the image capturing apparatus according to the present invention is not limited to the digital camera, and is applicable to any electronic devices including such an image sensor. Examples of these electronic devices may include mobile phones, game machines, tablet terminals, personal computers, and wristwatch-type and eyeglass-type information terminals.

1: Configuration of Digital Camera 100

Figure 1:
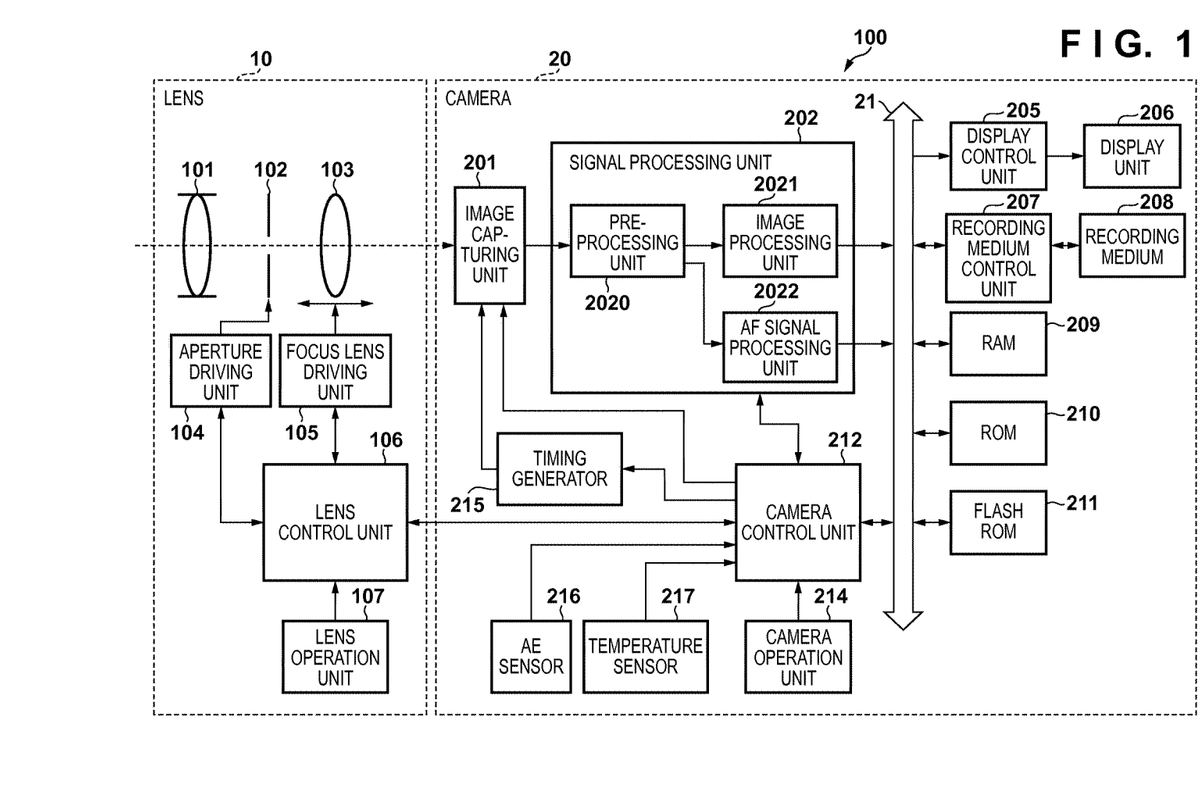
FIG. 1 is a block diagram showing a configuration example of functions of a digital camera as an example of an image capturing apparatus according to an embodiment of the present invention.

FIG. 1 is a block diagram showing a configuration example of functions of a digital camera 100 as an example of an image capturing apparatus of this embodiment. At least one of the functional blocks shown in FIG. 1 may be realized by hardware such as an ASIC and a programmable logic array (PLA), or may be realized by software executed by a programmable processor such as a CPU and an MPU. Further, the functional blocks may be realized as a combination of software and hardware. Accordingly, in the following description, even in the case where different functional blocks are depicted as the elements carrying out operations, those functional blocks can possibly be realized by the same instance of hardware.

The digital camera 100 is constituted by a lens 10 and a camera 20, in which a lens control unit 106 that controls the overall operation of the lens and a camera control unit 212 that controls the overall operation of the camera communicate with each other.

First, a configuration of the lens 10 will be described.

A first group lens 101 is a lens group constituted by a plurality of fixed lenses, and an aperture 102 is an aperture that controls the amount of light incident on an image capturing unit 201, which will be described below, and is driven by an aperture driving unit 104.

A focus lens 103 is a lens group for adjusting the focal point at which an image is formed in the image capturing unit 201, which will be described below, and is driven by a focus lens driving unit 105. The first group lens 101, the aperture 102, and the focus lens 103 constitute an imaging optical system.

The aperture driving unit 104 and the focus lens driving unit 105 determine the size of the aperture 102 and the position of the focus lens 103 based on the control by the lens control unit 106.

The lens control unit 106 is a control unit that controls the entirety of the lens 10, and controls the aperture driving unit 104 and the focus lens driving unit 105 in response to control information received from the camera control unit 212, which will be described below. Further, the lens control unit 106 transmits lens control information to the camera control unit 212.

A lens operation unit 107 is a ring or a switch that detects user operating instructions to the lens 10, and notifies the lens control unit 106 of a user operating instruction such as an instruction to change the focus mode when it is issued.

The lens control unit 106 executes a control in response to the user operation, which is the notification from the lens operation unit 107.

Next, a configuration of the camera 20 will be described. The camera control unit 212 is, for example, a CPU or an MPU, and is a control unit that controls the entirety of the digital camera 100 by developing a program stored in a ROM 210 or a flash ROM 211 to a working area of a RAM 209 and executing it. In this embodiment, the camera control unit 212 specifies imaging conditions by acquiring various information from a camera operation unit 214, an AE sensor 216, and a temperature sensor 217, and notifies the image capturing unit 201 of such imaging conditions. Examples of the various information include ISO sensitivity, F value, zoom position, and temperature inside the camera (such as the temperature of an image sensor (pixel array) included in the image capturing unit 201 and the temperature in the vicinity thereof).

The camera operation unit 214 is constituted by a button, a touch panel, and the like, that detect operating instructions from a user such as an instruction for imaging, recording, and reproducing, and is configured to notify the camera control unit 212 of a detected operating instruction. The camera control unit 212 controls various units so as to carry out the operating instruction by the user.

The camera 20 is configured to be capable of acquiring imaging signals by forming an image on a pixel array 2010 from the light flux passing through an imaging optical system of the lens 10.

1-2: Configuration of Image Capturing Unit 201

Figure 2:
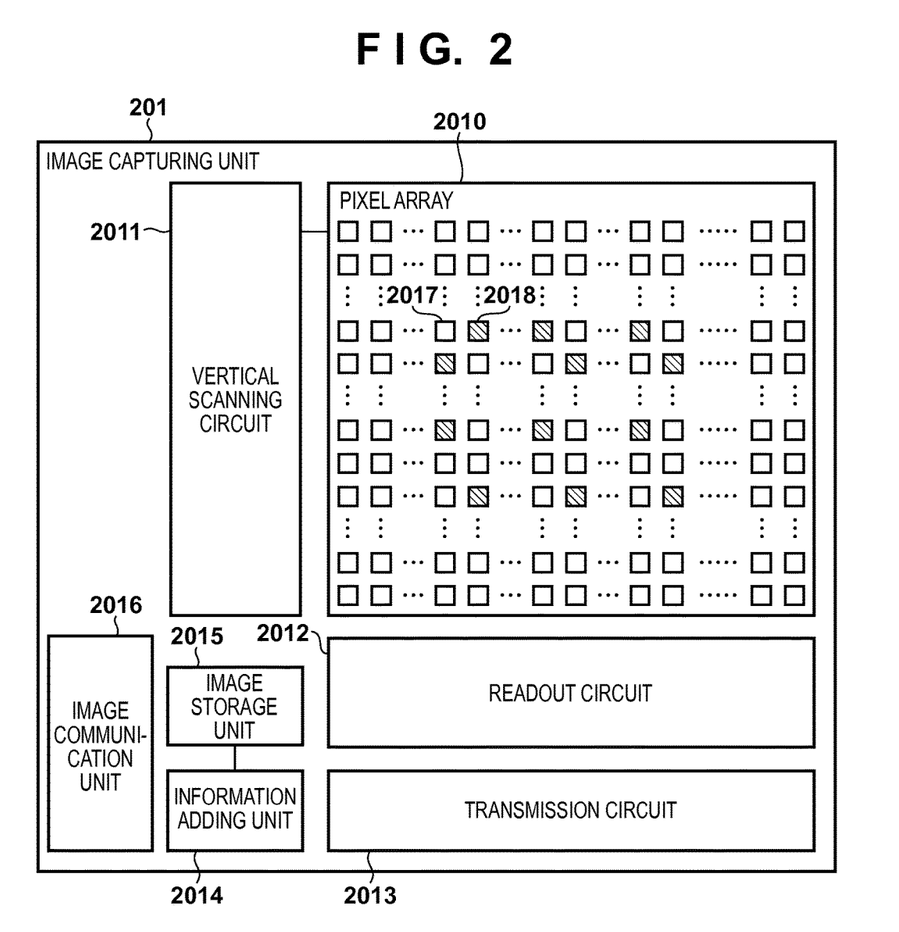
FIG. 2 is a block diagram showing a configuration example of functions of an image capturing unit according to this embodiment.

A configuration of the image capturing unit 201 will be described with reference to FIG. 2.

The pixel array 2010 is an image sensor such as a CCD (Charge-Coupled Device) image sensor and a CMOS (Complementary Metal Oxide Semiconductor) image sensor. An example of using a CMOS image sensor will be described herein. The light flux that has passed through the imaging optical system of the lens 10 forms an image on the light receiving surface of the pixel array 2010, and the image is converted into signal charges corresponding to the amount of the incident light using photodiodes.

In the pixel array 2010, image forming pixels 2017 and phase-difference detecting pixels 2018 capable of photoelectrically converting a part of the light flux passing through the microlens and outputting it for imaging plane phase difference AF are arranged. Further, the phase-difference detecting pixels 2018 are configured so that a part on the left side of the light flux passing through the microlens or a part on the right side of the light flux is input for acquiring two different image signals. An AF signal processing unit 2022, which will be described below, performs a correlation calculation of the two image signals output by the phase-difference detecting pixels 2018, and calculates the amount of deviation of the image and various reliability information.

The signal charges accumulated in photodiodes are sequentially read out as voltage signals corresponding to the respective signal charges from the pixel array 2010 by a vertical scanning circuit 2011 and a readout circuit 2012 that are controlled by drive pulses of a timing generator 215 in accordance with commands of the camera control unit 212. The readout circuit 2012 has a plurality of A/D converters and outputs digital signals to a transmission circuit 2013.

An image storage unit 2015 is a storage device such as a RAM 209, and is capable of storing information from outside the circuits by receiving the content of a serial communication from the camera control unit 212 via an image communication unit 2016.

An information adding unit 2014 is constituted by a multiplexer, and is configured to select the information contained in the instruction from the camera control unit 212 via the image communication unit 2016 out of the information stored in the image storage unit 2015 and to output it as digital signals to the transmission circuit 2013. The output to the transmission circuit 2013 is performed at a desired timing according to a pulse signal of the timing generator 215. Further, the information adding unit 2014 updates the content of the instruction from the camera control unit 212 obtained via the image communication unit 2016 on every vertical synchronization signal of the timing generator 215. The information adding unit 2014 receives information on the imaging conditions, which will be described below, from the camera control unit 212, specifies an index (identification information) designating correction parameters corresponding to the imaging conditions stored in advance, adds the specified index to the digital signals, and outputs the digital signals. The correction parameters and the index will be described later.

The transmission circuit 2013 generates output signals of the image capturing unit 201 from the digital signals of the readout circuit 2012 and the digital signals of the information adding unit 2014, which will be described below, and outputs the signals to a signal processing unit 202. The output signals are output, for example, in conformity with LVDS (Low voltage differential signaling).

In this embodiment, two image signals passing through the microlens on the left side and the right side are used for the AF application, but a configuration other than the configuration in which image signals are obtained by extracting a part of the light flux passing through the microlens may be employed, and the number of image signals also may be two or more.

1-3: Configuration of Output Signals of Image Capturing Unit 201

Figure 3A:
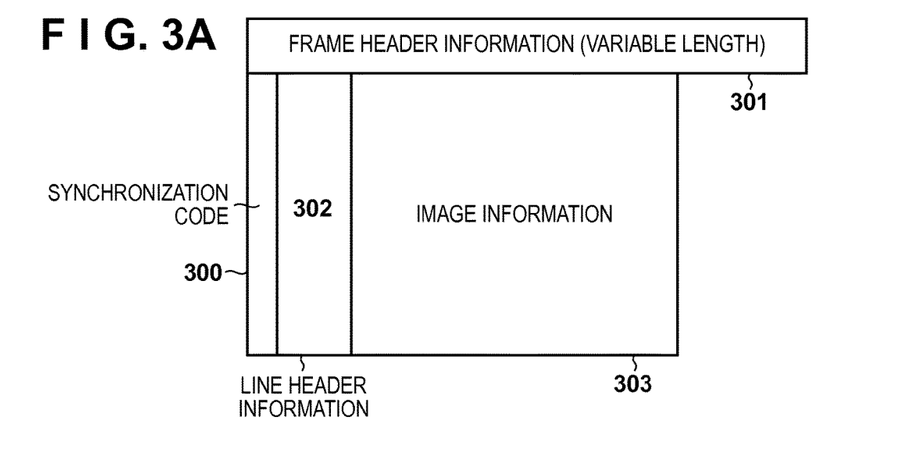
FIG. 3A is a diagram schematically showing an output signal format of the image capturing unit according to this embodiment.

The format of output signals generated in the image capturing unit 201 will be described with reference to FIG. 3A. The output signals are composed of a synchronization code 300, frame header information 301, line header information 302, and image information 303.

The synchronization code 300 is a code used in determining a start of each line of image data, to which a specific code that is not used for the image information 303 is assigned.

Figure 3B:
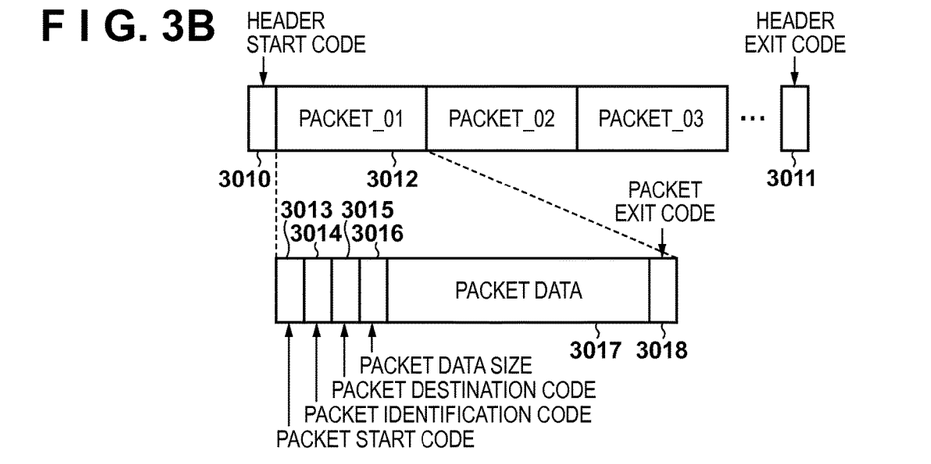
FIG. 3B is a diagram schematically showing a header information format according to this embodiment.

The frame header information and the line header information are composed in accordance with the format shown in FIG. 3B. The frame header information 301 and the line header information 302 are information with a variable length that is defined by a header start code 3010 and a header exit code 3011, and are composed of a plurality of packets 3012. Also to the header start code 3010 and the header exit code 3011, codes that are not used for the image information 303 are desirably assigned.

A packet 3012 is data that is defined by a packet start code 3013 and a packet exit code 3018, and includes a packet identification code 3014, a packet destination code 3015, a packet data size 3016, and packet data 3017.

Since the packet start code 3013 and the packet exit code 3018 are embedded between the header start code 3010 and the header exit code 3011, codes not overlapping with data that is added to the packet can be used.

The packet identification code 3014 is any integer value assigned for identifying the packet. Further, the packet destination code 3015 indicates the destination of the packet. The packet data size 3016 is an integer value that indicates the number of words in the packet data. The packet identification code 3014, the packet destination code 3015, and the packet data size 3016 are used for passing necessary information to each functional block of the signal processing unit 202, which will be described below. Whether to add them to the frame header information 301 or the line header information 302 may be appropriately determined depending on the data size.

The pixel data of image forming pixels and phase-difference detecting pixels of the image capturing unit 201 is stored as the image information 303. The pixel data of the phase-difference detecting pixels can be accessed by designating the pixel positions using pixel arrangement information, which will be described below.

1-4: Configuration of Frame Header Information in Output Signals

Figure 3C:
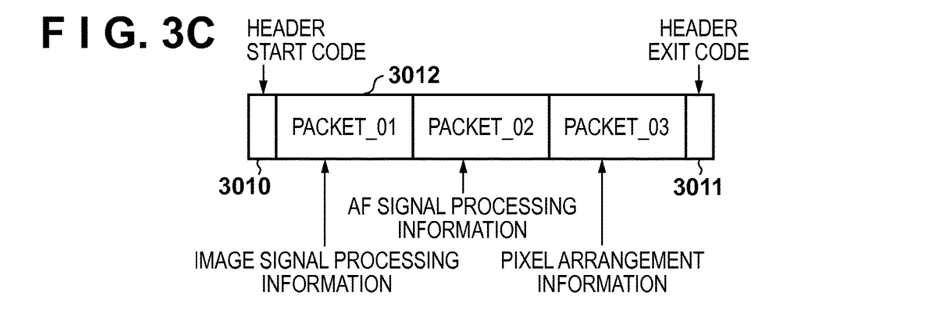
FIG. 3C is a diagram schematically showing an example of header information according to this embodiment.

Here, the frame header information in the output signals of the image capturing unit 201 in this embodiment will be described with reference to FIG. 3C.

In the frame header information 301, image signal processing information and AF signal processing information, whose contents are changed depending on imaging conditions, and pixel arrangement information, which will be described below, are stored in the respective packets (these pieces of information will be referred to collectively as additional information). These pieces of information are in one-to-one correspondence with the image information 303.

The image signal processing information is information uniquely determined by imaging conditions such as ISO sensitivity, F value, exit pupil distance, and temperature. An image processing unit 2021, which will be described below, specifies correction parameters from the image signal processing information, and makes a correction to the image forming pixels that is necessary due to the phase-difference detecting pixels existing in the image information 303 together with the image forming pixels. The correction to the image forming pixels is made against the image degradation such as a fixed pattern derived from level bias in the phase-difference detecting pixels and the image forming pixels. Examples of the image degradation include the case where the arrangement pattern of the phase-difference detecting pixels seems to overlap an image due to the phase-difference detecting pixels having offset components and sensitivity components that are different from the other image forming pixels.

In another example, there is a case where the phase-difference detecting pixels have characteristics with a tendency to cause leakage of charges or incident light flux in a specific direction, thereby causing crosstalk with adjacent pixels, as a result of which patterned color unevenness occurs in pixels around the phase-difference detecting pixels.

To deal with the image degradation as exemplified above, correction parameters used for correction processing are specified by the optical conditions such as F value and exit pupil distance, the conditions that affect SN such as ISO sensitivity, and the conditions that affect the amount of noise such as temperature and dark current, where such conditions are treated in the image signal processing information.

Figure 4:
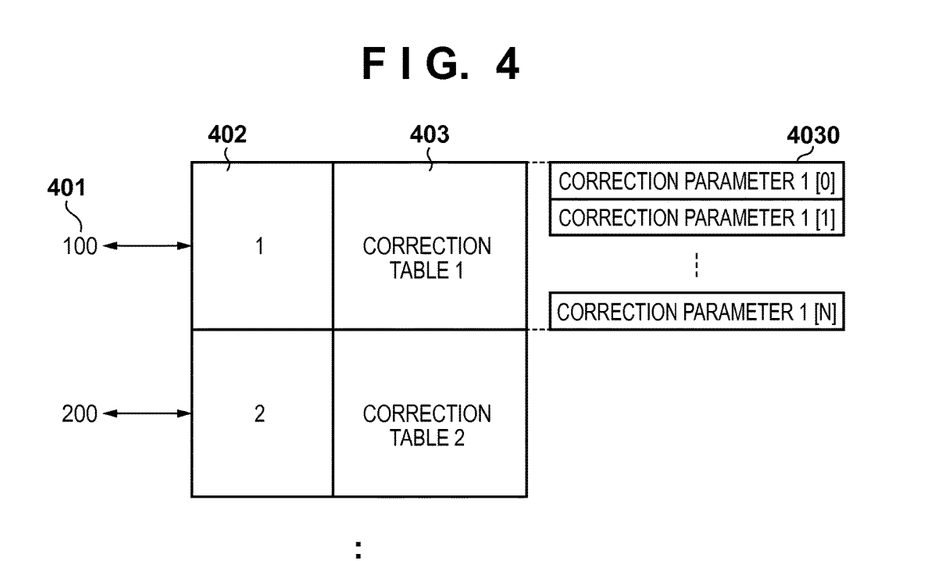
FIG. 4 is a diagram showing an example of a correction table according to this embodiment.

As an example of the image signal processing information, FIG. 4 shows a case where the correction parameters are uniquely determined only by an ISO sensitivity. Correction tables 403 shown in FIG. 4 are composed of at least one correction parameter 4030, and are in one-to-one correspondence with ISO sensitivities 401. Further, indices 402 corresponding to the ISO sensitivities on a one-to-one basis are assigned to the respective correction tables (1 to n). Thus, a necessary correction table is specified corresponding to an ISO sensitivity. Without being limited to the example of the ISO sensitivity, also in the case where a correction table is specified based on another plurality of conditions, a correction table necessary for the imaging conditions can be specified using a single index system by assigning an index that uniquely specifies the combination of the plurality of conditions. The image processing unit 2021 that has received the image signal processing information refers to the correction tables 403 recorded in advance, and specifies correction parameters corresponding to the index stored in the image signal processing information. In this way, when the index is contained in the image signal processing information, the amount of information to be transmitted from the image capturing unit can be reduced. However, it does not matter if the image capturing unit 201 stores information equivalent to the correction parameters in the image signal processing information, and the image processing unit 2021 acquires the information equivalent to the correction parameters stored therein.

In this way, addition of an index of a correction table to the image signal processing information enables the image processing unit 2021 to synchronize with the image information 303 as a target of the processing and to acquire correction parameters that are the control information of the image information 303. That is, the camera control unit 212 can reflect imaging conditions such as ISO sensitivity, F value, exit pupil distance, and temperature via the image communication unit 2016 without directly controlling the image processing unit 2021 (for example) that preforms the processing. Further, as is obvious from the description, the image signal processing information is distinguished from the AF signal processing information described below. This enables each of a plurality of functional blocks that correct their individual correction parameters to execute correction processing specified by the index by itself.

The AF signal processing information is, for example, information that is uniquely determined by imaging conditions such as ISO sensitivity, F value, exit pupil distance, and temperature. The AF signal processing unit 2022, which will be described below, specifies correction parameters from the AF signal processing information, and makes a correction for generating an image composed of the phase-difference detecting pixels to be used for phase difference AF. The correction to the phase-difference detecting pixels is made against the deterioration of image signals such as vignetting derived from the phase-difference detecting pixels using a part of the light flux passing through the microlens or offset noise derived from the structure of the phase-difference detecting pixels. At this time, the correction parameters for performing the correction processing are specified by the optical conditions such as F value and exit pupil distance, the conditions that affect SN such as ISO sensitivity, and the conditions that affect the amount of noise such as temperature and dark current.

The AF signal processing information designates a necessary correction table by assigning an index corresponding to the relevant conditions, in the same manner as the image signal processing information shown in FIG. 4. As described above, assignment of an index as the AF signal processing information of the frame header information enables the AF signal processing unit to synchronize with the image information 303 as a processing object and to acquire correction parameters that are the control information of the image information 303. The camera control unit 212 transmits imaging conditions such as ISO sensitivity, F value, exit pupil distance, and temperature to the image communication unit 2016, thereby allowing the AF signal processing information to reflect the imaging conditions set in imaging.

Figure 5:
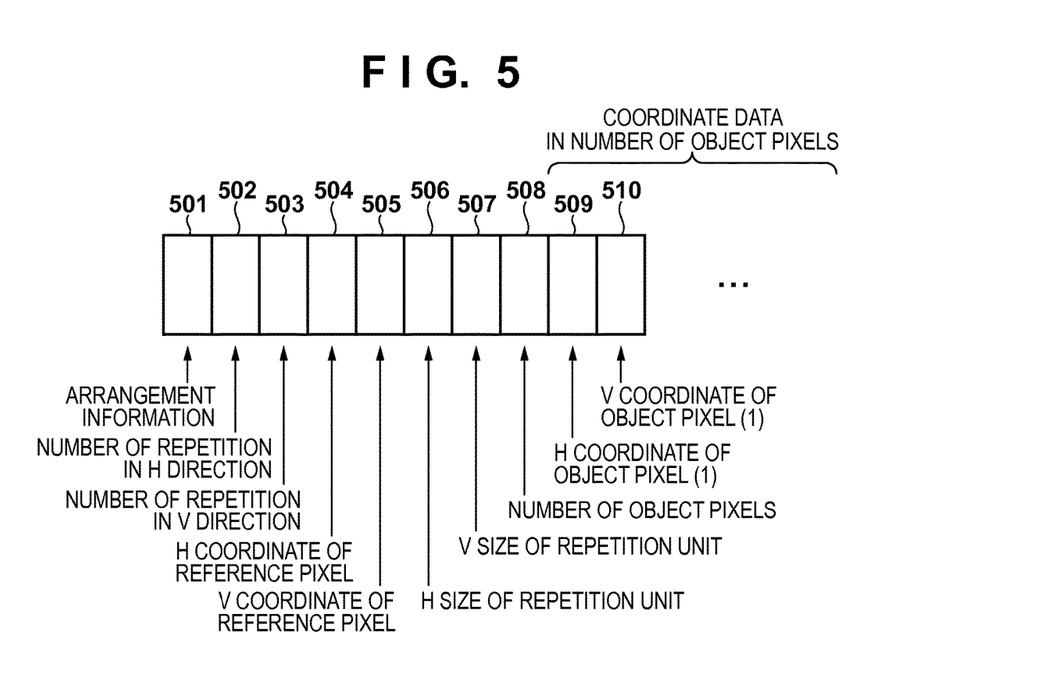
FIG. 5 is a diagram showing an example of pixel arrangement information according to this embodiment.

The pixel arrangement information will be described with reference to FIG. 5. The pixel arrangement information is information specifying the arrangement of the phase-difference detecting pixels contained in the image information 303. The pixel arrangement information is described according to a two-dimensional coordinate system defined along the H direction (the horizontal direction or the row direction) and the V direction (the vertical direction or the column direction), using pixels as coordinate units. The coordinates of an arbitrary reference pixel, a repeating unit defined by its dimension in the H direction and the V direction from the coordinates of the reference pixel, and the positions of object pixels relative to the coordinates of the reference pixel serving as the origin are depicted as coordinates of the object pixels. Such a description specifies the arrangement of the object pixels periodically repeated in the defined repeating units. The pixel arrangement information can uniquely specifies the arrangement of the phase-difference detecting pixels by describing the coordinates of the phase-difference detecting pixels as the coordinates of the object pixels. As will be described later, identical information to the pixel arrangement information is provided to the functional blocks constituting the signal processing unit 202, that is, the image processing unit 2021 and the AF signal processing unit 2022.

Further, there are a plurality of read modes, and different readout such as thinned readout or cropped readout can be performed for each mode. In the case where the phase-difference detecting pixel coordinates in the image information 303 vary, the camera control unit 212 transmits the coordinates of the reference pixel, the repeating unit, and the coordinates of the object pixels, which are suitable for each mode, to the image communication unit 2016. Thus, the image capturing unit 201 outputs additional information containing image arrangement information after reflecting the imaging conditions set in imaging. However, the definition of the pixel arrangement information is not limited to the aforementioned description, and a method in which all coordinates of the object pixels are listed and designated may be employed.

1-5: Configuration of Signal Processing Unit 202

Figure 6:
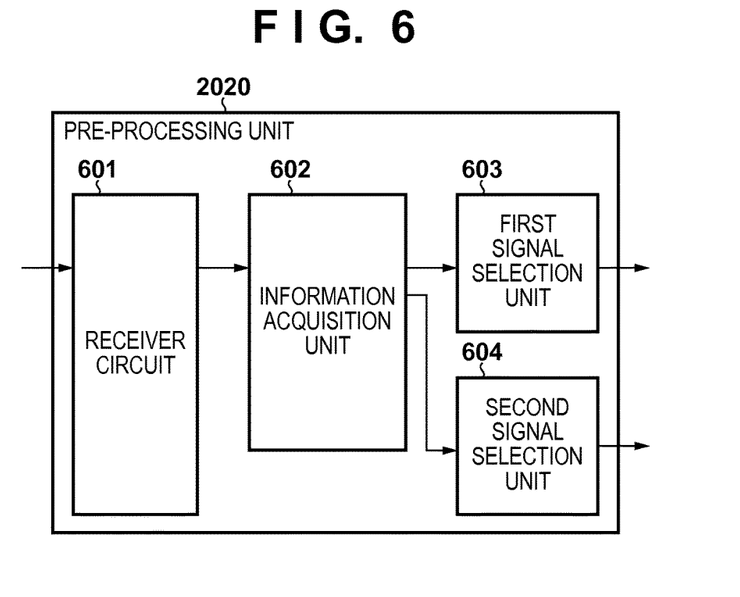
FIG. 6 is a diagram schematically showing a pre-processing unit according to this embodiment.

As shown in FIG. 6, the signal processing unit 202 is a DSP constituted by a pre-processing unit 2020, the image processing unit 2021, and the AF signal processing unit 2022.

Configuration of Pre-Processing Unit 2020

The pre-processing unit 2020 is constituted by a receiver circuit 601 that receives the output signals of the image capturing unit 201, an information acquisition unit 602, a first signal selection unit 603, and a second signal selection unit 604.

The output signals output from the image capturing unit 201 are received by the receiver circuit 601, and thereafter the frame header information and the line header information of the output signals are acquired by the information acquisition unit 602. The additional information acquired from the frame header information is output to the first signal selection unit 603 and the second signal selection unit 604 for each packet, according to the packet destination code. In this embodiment, the destination of the packet destination code is, for example, set as follows.

In the case where the packet destination code is "00", the packet is output to both of the first signal selection unit 603 and the second signal selection unit 604. In the case where the packet destination code is "01", the packet is output to the first signal selection unit 603. In the case where the packet destination code is "10", the packet is output to the second signal selection unit 604. In the case where the packet destination code is "11", the packet is output to neither of the signal selection units.

The information acquisition unit 602 distributes packets to the first signal selection unit 603 and the second signal selection unit 604 until the imaging header exit code is detected. The packet destination code is not limited to 2-bit signals as mentioned above, and the expression method is not restrictive at all.

In this embodiment, "01" is assigned to "image signal processing information", "10" is assigned to "AF signal processing information", and "00" is assigned to "pixel arrangement information" as the packet destination codes of each packet. Therefore, "image signal processing information" is output to the first signal selection unit 603, and "AF signal processing information" is output to the second signal selection unit 604. Further, "pixel arrangement information" is output to both of the first signal selection unit 603 and the second signal selection unit 604.

Further, as the image information 303, the first signal selection unit 603 outputs the whole pixel information of the image information 303. On the other hand, the second signal selection unit 604 outputs only pixel information of the image information 303 that is designated by the pixel arrangement information.

Configuration of Image Processing Unit 2021

Figure 7:
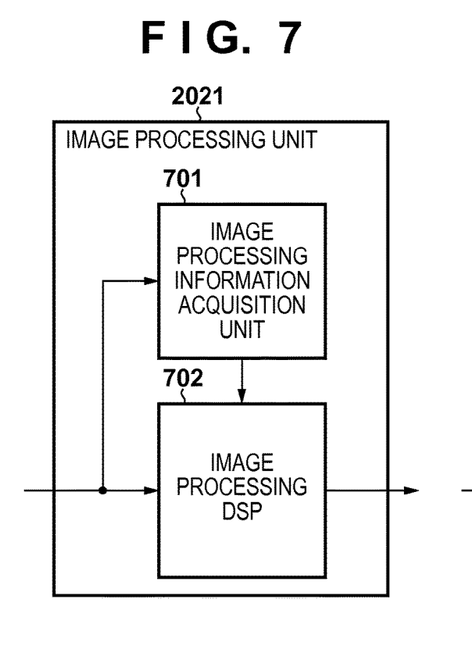
FIG. 7 is a diagram schematically showing an image signal processing unit according to this embodiment.

Next, the image processing unit 2021 will be described with reference to FIG. 7. The image processing unit 2021 is constituted by an image processing information acquisition unit 701 and an image processing DSP 702.

The image processing information acquisition unit 701 acquires image signal processing information and pixel arrangement information from input signals, and outputs them to the image processing DSP 702. As described above, the image processing information acquisition unit 701 refers to the correction tables recorded in advance based on the index stored in the image signal processing information, and acquires correction parameters corresponding to the index stored in the image signal processing information.

The image processing DSP 702 acquires the correction parameters from the image signal processing information, specifies pixels required to be corrected from the pixel arrangement information, and appropriately corrects the pixels required to be corrected.

The output signals of the image processing unit 2021 are further developed, converted into a widely used image compression format such as JPEG via a recording medium control unit 207, and recorded in a recording medium 208 such as an SD card. Further, the output signals of the image processing unit 2021 are displayed on a display unit 206 via a display control unit 205.

Configuration of AF Signal Processing Unit 2022

Figure 8:
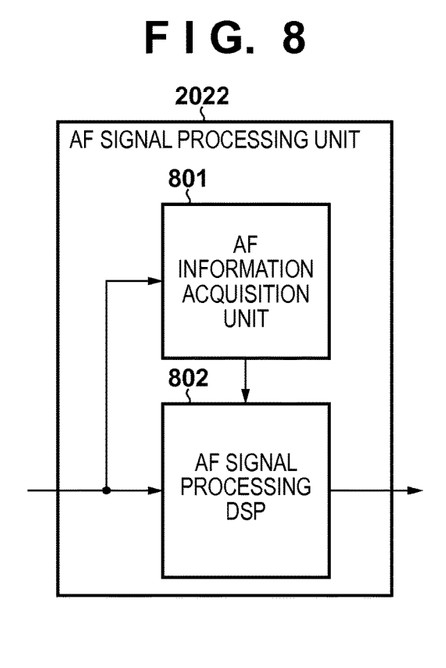
FIG. 8 is a diagram schematically showing an AF signal pre-processing unit according to this embodiment.

Next, the AF signal processing unit 2022 will be described with reference to FIG. 8. The AF signal processing unit 2022 is constituted by an AF information acquisition unit 801 and an AF signal processing DSP 802. The AF information acquisition unit 801 acquires AF signal processing information and pixel arrangement information from input signals, and outputs them to the AF signal processing DSP 802. The AF information acquisition unit 801 refers to the correction tables recorded in advance based on the index stored in the AF signal processing information, and acquires correction parameters corresponding to the index stored in the AF signal processing information.

The AF signal processing DSP 802 acquires the correction parameters from the AF signal processing information, and performs appropriate image correction processing on the phase-difference detecting pixels required to be corrected by specifying the phase-difference detecting pixels required to be corrected from the pixel arrangement information. Phase-difference detecting signals output from the AF signal processing unit 2022 are developed in the RAM 209, and are used for calculating the lens driving amount by the camera control unit 212.

It should be noted that the signal processing unit 202 is not necessarily a single DSP, and the configuration thereof is not limited, as long as data can be exchanged between the processing units as described above.

1-6: Sequence of Actions Including Correction Processing in Digital Camera 100

Figure 9:
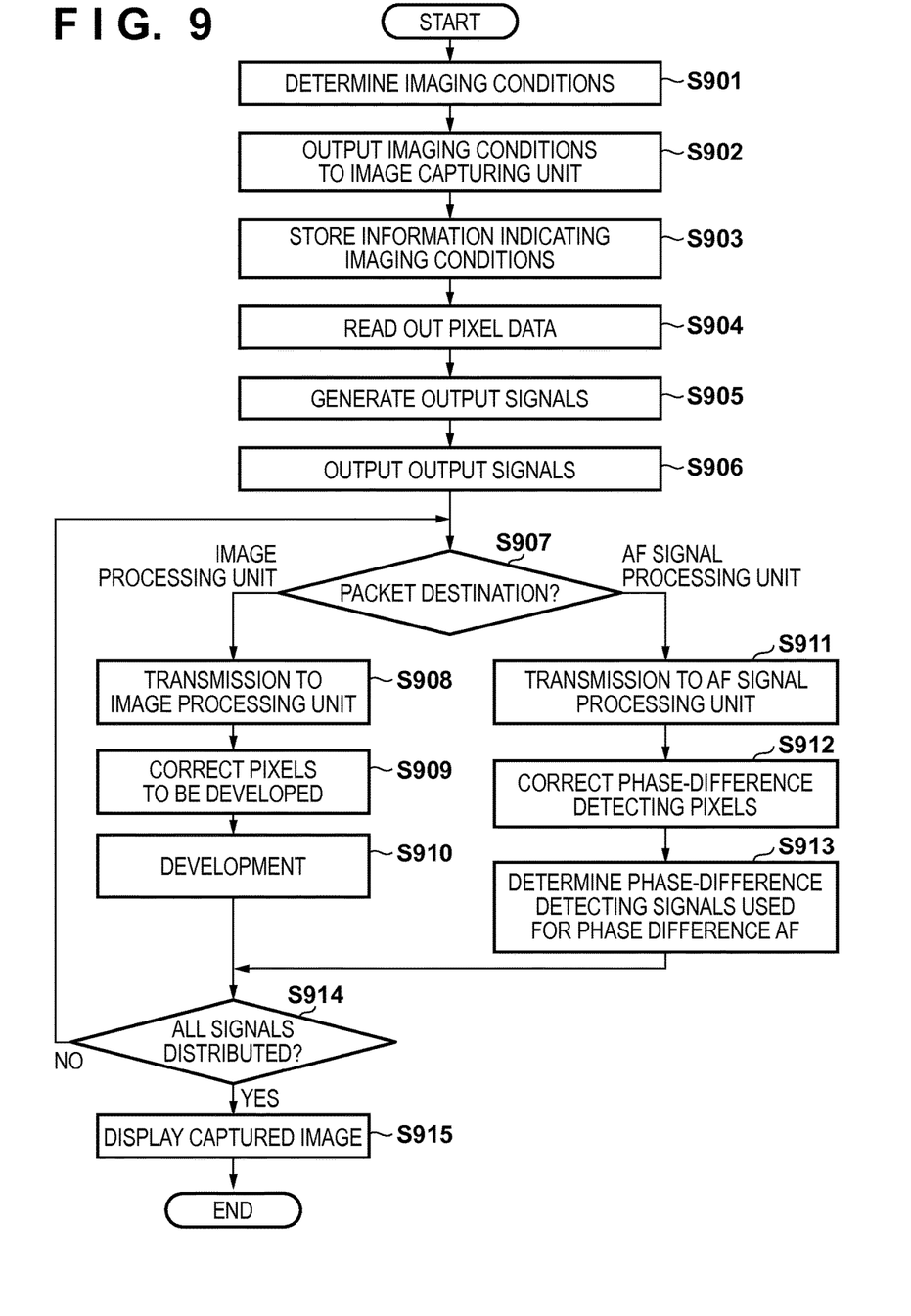
FIG. 9 is a flowchart explaining a sequence of actions of correction processing in the digital camera according to this embodiment.

Next, a sequence of actions including the correction processing in the digital camera 100 according to this embodiment will be described with reference to FIG. 9. It should be noted that the sequence of actions in this embodiment is started at the time when the release button of the camera operation unit 214 is pressed and is kept half-pressed while a live view is displayed on the display unit 206. Further, this processing is realized by the camera control unit 212 developing the program stored in the ROM 210 or the flash ROM 211 to a working region of the RAM 209 and executing it.

In step S901, the camera control unit 212 determines imaging conditions based on the imaging mode pre-set by the user or the output from the AE sensor 216 and the temperature sensor 217.

In step S902, the camera control unit 212 outputs information indicating the determined imaging conditions to the image capturing unit 201 in order to set the imaging conditions in the image capturing unit 201. At this time, the camera control unit 212 may control the functional blocks of the digital camera 100 to reflect the imaging conditions. For example, a control instruction to reflect the determined imaging conditions is issued by a communication with the lens control unit 106 of the lens 10.

In step S903, the image capturing unit 201 acquires the information indicating the imaging conditions output from the camera control unit 212 via the image communication unit 2016, and stores it in the image storage unit 2015.

In step S904, the image capturing unit 201 reads out pixel data of image forming pixels and phase-difference detecting pixels. More specifically, pixel data of the image forming pixels and the phase-difference detecting pixels that is read out from the pixel array 2010 and digitally converted by the readout circuit 2012 of the image capturing unit 201 is output to the transmission circuit 2013.

In step S905, the image capturing unit 201 generates output signals containing the additional information and the read-out pixel data. In step S903, the image capturing unit 201 reads out the information indicating the imaging conditions stored in the image storage unit 2015, so as to specify correction parameters corresponding to the imaging conditions stored in advance, and further to specify an index designating the correction parameters. Here, the correction parameters are individual parameters for correcting the image forming pixels and the phase-difference detecting pixels. Further, the image capturing unit 201 generates pixel arrangement information by extracting the position information of the phase-difference detecting pixels stored in advance, and generates additional information from the specified index and the pixel arrangement information. Then, the image capturing unit 201 stores the additional information and the read-out pixel data in the format shown in FIGS. 3A-3C, and generates output signals.

In step S906, the image capturing unit 201 outputs the generated output signals to the signal processing unit 202.

In step S907, the pre-processing unit 2020 of the signal processing unit 202 decodes the output signals output from the image capturing unit 201, and distributes the output signals. The distribution of the output signals is performed by determining the aforementioned packet destination, and in the case where it is determined that the packet destination is the image processing unit 2021, the process proceeds to step S908. On the other hand, in the case where it is determined that the packet destination is the AF signal processing unit 2022, the process proceeds to S911.

In step S908, the pre-processing unit 2020 outputs image signal processing information, pixel arrangement information, and image information that are decoded from the aforementioned output signals to the image processing unit 2021 of the signal processing unit 202.

In step S909, the image processing unit 2021 corrects the input image information as described above with reference to FIG. 7. At this time, the image processing unit 2021 refers to the correction tables recorded in advance, based on the index obtained from the image signal processing information, and acquires correction parameters corresponding to the index. The image processing unit 2021 outputs corrected image information, and stores it in the RAM 209.

In step S910, the camera control unit 212 further develops the corrected image information output from the image processing unit 2021 and stored in the RAM 209, and outputs it to the display control unit 205 so that a captured image is displayed on the display unit 206.

Next, in step S911, the pre-processing unit 2020 outputs AF signal processing information, pixel arrangement information, and image information decoded from the aforementioned output signals to the AF signal processing unit 2022 of the signal processing unit 202.

In step S912, the AF signal processing unit 2022 corrects the phase-difference detecting pixels of the input image information, as described above with reference to FIG. 8. At this time, the AF signal processing unit 2022 refers to the correction tables recorded in advance, based on the index obtained from the AF signal processing information, and acquires correction parameters corresponding to the index.

In step S913, the AF signal processing unit 2022 determines phase-difference detecting signals to be used for phase difference AF using image data of the two images that have been corrected, and stores the determined phase-difference detecting signals in the RAM 209. These phase-difference detecting signals are used for calculating the lens driving amount by the camera control unit 212.

In step S914, the pre-processing unit 2020 determines whether or not the distribution of the output signals has been completed, and in the case of being not completed, the process returns to step S907 again, whereas in the case of being completed, the process proceeds to step S915.

In step S915, the display control unit 205 causes the display unit 206 to display the captured image after the development that is output in step S910. Thus, the captured image is displayed on the display unit 206 as a live view. Then, the camera control unit 212 ends the sequence of actions according to this embodiment.

It should be noted that the distribution of the output signals to the image processing unit 2021 and the AF signal processing unit 2022 performed by the pre-processing unit 2020 in step S914 is not necessarily started after the completion of the processing by the two processing units, and the distribution to the two processing units may be completed before the processing by the two processing units is started.

Further, the camera control unit 212 performs the development in step S910, but a developing unit may be provided in the signal processing unit 202 so as to perform the processing, or the image processing unit 2021 may further perform the development. Further, the sequence of actions to display the live view is described above, but this embodiment is applicable also to the case where the captured image is recorded in the recording medium 208 by fully pressing the release button. After the aforementioned AF control following the step S913, the process may be started from step S901 again, so that the captured image is recorded in the recording medium 208 while the display on the display unit 206 is performed.

As has been described above, this embodiment is configured so that the signal processing unit 202 acquires additional information generated in the image capturing unit 201 together with pixel data, and corrects the effect on the pixel data derived from the inclusion of the phase-difference detecting pixels. Further, even in the case where the signal processing unit 202 is constituted by a plurality of functional blocks, correction parameters necessary for the respective blocks are sequentially acquired together with the pixel data. In this way, even in the case where each pixel data is corrected in different functional blocks, the processing load on the camera control unit 212 for controlling such as selection of correction parameters is reduced, and central correction processing using output signals from the image capturing unit 201 is enabled. That is, in the case where the image sensor includes the phase-difference detecting pixels, the load on the control unit for controlling correction processing due to the inclusion can be reduced by eliminating the need for a complex control by the camera control unit 212.

Further, the additional information contains an index specifying correction parameters corresponding to a plurality of imaging conditions. In this way, even in the case where the types of imaging conditions necessary for correction processing increase, an increase in the amount of the frame information provided by the image capturing unit 201 can be suppressed.

Further, in the additional information, an index (which is equivalent to control information corresponding to each functional block) is distinguishably stored for each functional block that executes correction processing. This enables the functional block to receive the image information 303 and to execute correction processing specified by the index by itself. Accordingly, the processing load due to the control corresponding to the imaging conditions by the camera control unit 212 can be reduced.

Further, the camera control unit 212 provides information associated with the imaging conditions to the image capturing unit 201. Thus, a control instruction for correction processing to be performed by the control unit can be provided at a time together with the image information to the signal processing unit 202. Further, the correction parameters are updated in the image capturing unit 201 based on the imaging conditions, and the updated parameters can be centrally provided to the signal processing unit 202.

Further, this embodiment employs a configuration in which the additional information transmitted by the image capturing unit 201 includes the AF signal processing information and the position information of the phase-difference detecting pixels. In this way, pixels to be corrected and details of the correction can be easily specified, when pixel data of phase-difference detecting pixels is corrected. Therefore, there is no need for an instruction concerning the position information of the phase-difference detecting pixels by the camera control unit 212, and further the processing load on the signal processing unit 202 can be reduced.

Second Embodiment

Figure 10A:
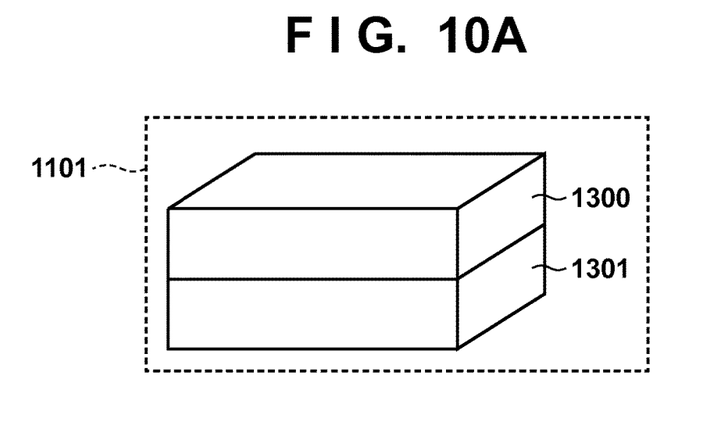
FIGS. 10A and 10B are views showing an image sensor included in an image capturing unit according to Second embodiment.
Figure 10B:
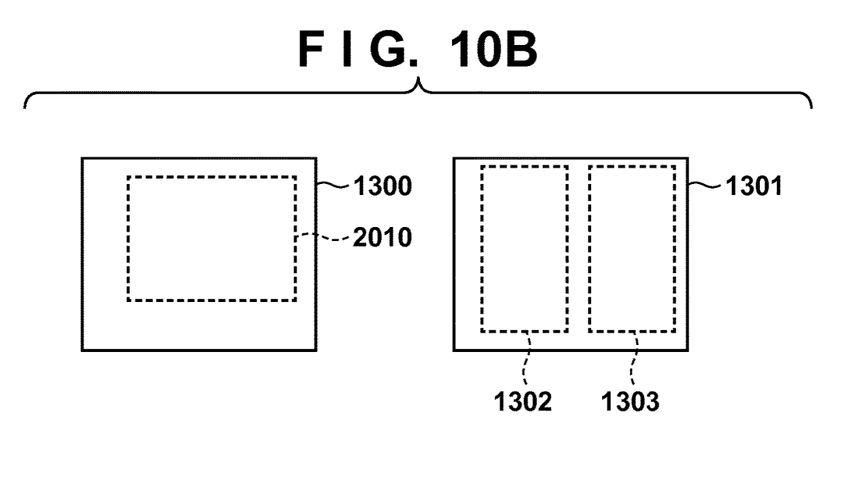

Next, another embodiment of the present invention will be described. This embodiment shows an example in which the image sensor included in the image capturing unit 201 is of a stack type. As shown in FIGS. 10A and 10B, an image sensor 1101 of this embodiment includes an image sensor chip 1300 and a high-speed logic process chip 1301 that are stacked at the chip level. FIG. 10A is an oblique projection view of the chips, and FIG. 10B shows top views of the respective chips. The image sensor chip 1300 includes the pixel array 2010 having a lot of pixels, for example. Further, the high-speed logic process chip 1301 includes parts 1302 and 1303 capable of high-speed processing including digital data, such as the readout circuit 2012, the transmission circuit 2013, the information adding unit 2014, the image storage unit 2015, and the image communication unit 2016.

Third Embodiment

Figure 11:
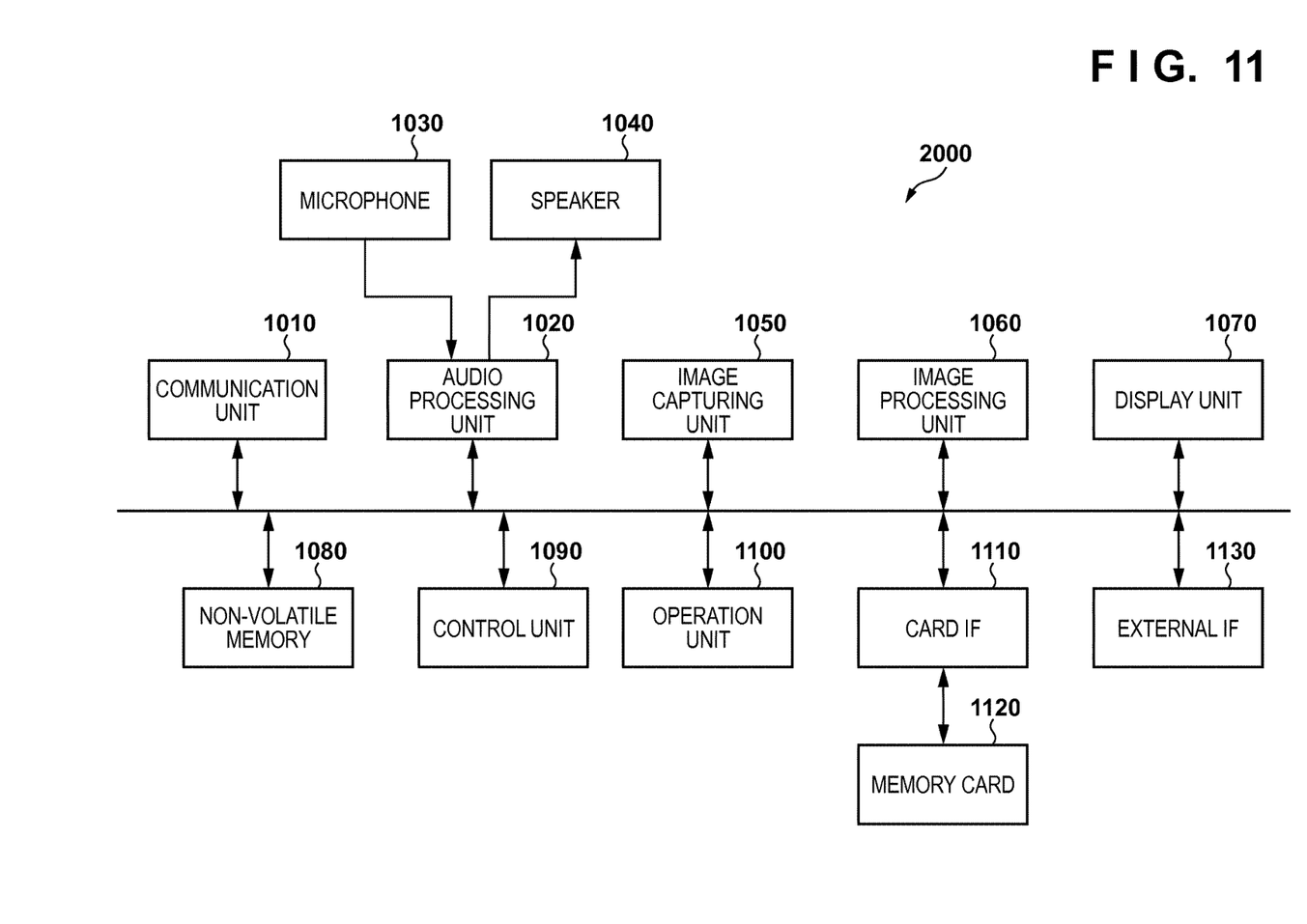
FIG. 11 is a block diagram showing a configuration example of functions of a mobile phone as an example of an image capturing apparatus according to Third embodiment.

FIG. 11 is a block diagram showing a configuration of a mobile phone 2000 as still another embodiment of the present invention. The mobile phone 2000 of this embodiment has functions such as an e-mail function, an internet connection function, and image capturing and reproducing functions, in addition to a voice communication function.

In FIG. 11, a communication unit 1010 communicates audio data and image data with another phone by a communication method in accordance with a communication carrier that has a contract with the user. In voice communication, an audio processing unit 1020 converts audio data from a microphone 1030 to be in a format suitable for transmission and transmits it to the communication unit 1010. Further, the audio processing unit 1020 decodes the audio data from a communication partner that is transmitted by the communication unit 1010, and transmits it to a speaker 1040. The image capturing unit 1050 having the same configuration as the image capturing unit 201 described in First embodiment captures a subject image and outputs image data. An image processing unit 1060 having the configuration of the signal processing unit 202 described in First embodiment processes the image data captured by the image capturing unit 1050 in image capturing, converts it into a format suitable for recording, and outputs it. Further, in reproducing the recorded image, the image processing unit 1060 processes the reproduced image and transmits it to a display unit 1070. The display unit 1070 includes a liquid crystal display panel of about several inches, and displays various screens corresponding to instructions from a control unit 1090. A non-volatile memory 1080 stores data such as address book information, e-mail data, and image data captured by the image capturing unit 1050.

The control unit 1090 has a CPU, a memory, and the like, and controls various units of the phone 2000 in accordance with a control program stored in a memory which is not shown. The control unit 1090 has the configuration of the camera control unit 212 described in First embodiment. An operation unit 1100 includes a power button, a number key, and other various operation keys for the user to input data. A card IF 1110 records and reproduces various data in a memory card 1120. An external IF 1130 transmits the data stored in the non-volatile memory 1080 or the memory card 1120 to an external device, and further receives data transmitted from the external device. The external IF 1130 performs communication by a known communication method such as wired communication method using a USB or the like and wireless communication.

Next, the voice communication function of the phone 2000 will be described. When making a phone call to a communication partner, the user inputs the number of the communication partner by operating the number key of the operation unit 1100, or issues a calling instruction by displaying the address book stored in the non-volatile memory 1080 on the display unit 1070 and selecting the communication partner. When a calling instruction is issued, the control unit 1090 controls the communication unit 1010 to call the communication partner. When the call arrives at the communication partner, the communication unit 1010 outputs audio data of the partner to the audio processing unit 1020, and transmits audio data of the user to the partner.

Further, when transmitting an e-mail, the user issues an instruction to create an e-mail using the operation unit 1100. When the instruction to create an e-mail is issued, the control unit 1090 displays a screen for creating an e-mail on the display unit 1070. Using the operation unit 1100, the user inputs a destination address and a body, and issues an instruction to send the e-mail. Upon the issuance of the instruction to send the e-mail, the control unit 1090 transmits data of the address information and the mail body to the communication unit 1010. The communication unit 1010 converts the mail data into a format suitable for communication, and transmits it to the destination. Further, upon reception of the e-mail, the communication unit 1010 converts the received mail data into a format suitable for displaying, and displays it on the display unit 1070.

Next, the imaging function of the phone 2000 will be described. After setting an imaging mode by operating the operation unit 1100, the user issues an instruction to capture a still image or a moving image, and then the image capturing unit 1050 captures the still image data or the moving image data and transmits it to the image processing unit 1060. The image processing unit 1060 processes the captured still image data or moving image data, and stores it in the non-volatile memory 1080. Further, the image processing unit 1060 transmits the captured still image data or moving image data in the card IF 1110. The card IF 1110 stores the still image data or moving image data in the memory card 1120.

Further, the phone 2000 can transmit a file containing the thus captured still image data or moving image data as an attached file of an e-mail. Specifically, when transmitting the e-mail, the user selects an image file stored in the non-volatile memory 1080 or the memory card 1120 as an attached file, and issues an instruction to send an e-mail.

Further, the phone 2000 also can transmit a file containing the captured still image data or moving image data to an external device such as a PC and another phone using the external IF 1130. The user selects an image file stored in the non-volatile memory 1080 or the memory card 1120 by operating the operation unit 1100, and issues an instruction to send an e-mail. The control unit 1090 reads out the selected image file from the non-volatile memory 1080 or the memory card 1120, and controls the external IF 1130 to transmit it to the external device.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-136216, filed Jul. 1, 2014 which is hereby incorporated by reference herein in its entirety.

What is claimed is:

1. An image sensor comprising:
a pixel array having image forming pixels and phase-difference detecting pixels;
a storage device for storing correction processing information received from an exterior controller;
an information adding circuit which adds the correction processing information stored in the storage device and position information of the phase-difference detecting pixels image data obtained from the pixel array as header information of the image data; and
an output circuit which outputs the image data comprising the header information.

2. The image sensor according to claim 1, wherein the information adding circuit adds, to the image data, the correction processing information corresponding to imaging conditions, and outputs the image data.

3. The image sensor according to claim 2, wherein the imaging conditions include at least one of sensitivity, aperture state, and temperature.

4. The image sensor according to claim 1, wherein the information adding circuit adds, to the image data, the correction processing information including the imaging conditions.

5. The image sensor according to claim 4, wherein the imaging conditions include at least one of sensitivity, aperture state, and temperature.

6. The image sensor according to claim 1, wherein the pixel array is formed on a first semiconductor chip and the information adding circuit and the output circuit are formed on a second semiconductor chip, and the first semiconductor chip and the second semiconductor chip are stacked on each other.

7. An image capturing apparatus comprising:
an image sensor including
a pixel array having image forming pixels and phase-difference detecting pixels,
a storage device for storing correction processing information received from an exterior controller;
an information adding circuit which adds the correction processing information stored in the storage device and position information of the phase-difference detecting pixels to image data obtained from the pixel array as header information of the image data, and
an output circuit which outputs the image data comprising the header information; and
an image processor which performs predetermined image processing on the image data using the correction processing information and the position information of the phase-difference detecting pixels.

8. The apparatus according to claim 7, wherein the image processor corrects a level difference between pixel data of the phase-difference detecting pixels and pixel data of the image forming pixels.

9. The apparatus according to claim 7, wherein the image processor corrects an effect of crosstalk of the phase-difference detecting pixels.

10. The apparatus according to claim 7, wherein the image processor includes a first processor which performs predetermined processing on pixel data of the phase-difference detecting pixels in order to generate a captured image, and a second processor which performs predetermined processing on the pixel data of the phase-difference detecting pixels in order to generate a phase-difference detecting signal, and the information adding circuit adds, to the image data, the correction processing information containing identification information of correction parameters to be used by the first processor and identification information of correction parameters to be used by the second processor.

11. The apparatus according to claim 10, wherein the image processor further includes a distributor which distributes the identification information of the correction parameters to be used by the first processor and the identification information of the correction parameters to be used by the second processor, which are contained in the correction processing information, respectively to the first processor and the second processor.

12. The image capturing apparatus according to claim 7, wherein
the pixel array is formed on a first semiconductor chip and the information adding circuit and the output circuit are formed on a second semiconductor chip, and the first semiconductor chip and the second semiconductor chip are stacked on each other.

13. A control method of controlling an image capturing apparatus which includes a pixel array having image forming pixels and phase-difference detecting pixels, the method comprising:
storing correction processing information received from an exterior controller;
adding the correction processing information stored in the storing step and position information of the phase-difference detecting pixels to image data obtained from the pixel array as header information of the image data in the image sensor;
outputting the image data from an image sensor, the image data comprising the header information; and performing predetermined image processing on the image data using the correction processing information and the position information of the phase-difference detecting pixels.

* * * * *